United States Patent
Reial et al.

(10) Patent No.: US 10,666,409 B2
(45) Date of Patent: *May 26, 2020

(54) MOBILITY REFERENCE SIGNAL ALLOCATION

(71) Applicant: Telefonaktiebolaget LM Ericsson (publ), Stockholm (SE)

(72) Inventors: Andres Reial, Malmo (SE); Andreas Cedergren, Bjarred (SE); Claes Tidestav, Balsta (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,021

(22) Filed: Jan. 28, 2019

(65) Prior Publication Data

US 2019/0181938 A1 Jun. 13, 2019

Related U.S. Application Data

(63) Continuation of application No. 14/775,709, filed as application No. PCT/EP2015/068838 on Aug. 17, 2015, now Pat. No. 10,374,680.

(51) Int. Cl.
*H04L 5/00* (2006.01)
*H04W 24/10* (2009.01)
(Continued)

(52) U.S. Cl.
CPC ......... *H04L 5/0048* (2013.01); *H04B 7/0617* (2013.01); *H04B 7/0634* (2013.01);
(Continued)

(58) Field of Classification Search
CPC ... H04L 5/0023; H04L 5/0051; H04L 5/0007; H04L 5/0048; H04L 27/2613; H04B 7/0617; H04W 24/10
See application file for complete search history.

(56) References Cited

U.S. PATENT DOCUMENTS

| 2010/0222007 A1* | 9/2010 | Rao | H04W 24/10 455/67.11 |
| 2014/0219237 A1* | 8/2014 | Charbit | H04W 72/044 370/330 |

(Continued)

FOREIGN PATENT DOCUMENTS

| JP | 2014027430 A | 2/2014 |
| JP | 2015528652 A | 9/2015 |

(Continued)

OTHER PUBLICATIONS

Japanese Office Action, dated Dec. 17, 2018, in connection with Japanese Application No. 2018-500486, 4 pages.

(Continued)

*Primary Examiner* — Omer S Mian
(74) *Attorney, Agent, or Firm* — Leffler Intellectual Property Law, PLLC

(57) ABSTRACT

There is provided a method and a network node for allocating and transmitting Mobility Reference Signals, MRS, for a communication device to measure beam signal quality in a wireless communication network. The network node obtains information on one or more of a frequency diversity, a time diversity of a channel between the network node and the communication device, an antenna spatial diversity of the communication device. The network node selects an MRS pattern out of a set of candidate patterns based on the received information, signals the selected MRS pattern to the communication device and transmits the MRS according to the selected MRS pattern.

19 Claims, 5 Drawing Sheets

(51) Int. Cl.
  *H04W 72/04* (2009.01)
  *H04B 7/06* (2006.01)
  *H04L 27/26* (2006.01)
  *H04B 7/10* (2017.01)
  *H04W 16/28* (2009.01)

(52) U.S. Cl.
  CPC ........ *H04L 5/0069* (2013.01); *H04L 27/2613* (2013.01); *H04W 24/10* (2013.01); *H04W 72/042* (2013.01); *H04B 7/10* (2013.01); *H04L 5/0007* (2013.01); *H04W 16/28* (2013.01)

(56) References Cited

U.S. PATENT DOCUMENTS

| | | |
|---|---|---|
| 2015/0155993 A1 | 6/2015 | Berggren et al. |
| 2015/0180632 A1 | 6/2015 | Kishiyama et al. |
| 2017/0094625 A1 | 3/2017 | Xu et al. |

FOREIGN PATENT DOCUMENTS

| | | |
|---|---|---|
| WO | 2014017224 A1 | 1/2014 |
| WO | 2014023361 A1 | 2/2014 |
| WO | 2014088185 A1 | 6/2014 |
| WO | 2014126519 A1 | 8/2014 |
| WO | 2015080645 A1 | 6/2015 |
| WO | 2015080646 A1 | 6/2015 |
| WO | 2015080648 A1 | 6/2015 |

OTHER PUBLICATIONS

English language Summary of Japanese Office Action, dated Dec. 17, 2018, in connection with Japanese Application No. 2018-500486, 3 pages.

PCT International Search Report, dated Apr. 13, 2016, in connection with International Application No. PCT/EP2015/068838, all pages.

PCT Written Opinion, dated Apr. 13, 2016, in connection with International Application No. PCT/EP2015/068838, all pages.

\* cited by examiner

MOBILITY REFERENCE SIGNAL ALLOCATION

CROSS-REFERENCE TO RELATED APPLICATIONS

This application claims the benefit of U.S. application Ser. No. 14/775,709 filed Sep. 13, 2015 (371(c) date), which is a 35 U.S.C. § 371 national stage of international application PCT/EP2015/068838 filed Aug. 17, 2015. All of these earlier applications are hereby incorporated herein by reference in their entireties.

TECHNICAL FIELD

Embodiments presented herein relate to mobility reference signal (MRS) allocation. In particular, they relate to a radio access network node and a method therein for allocating and transmitting mobility reference signals for a communication device to measure beam signal quality in a wireless communication network.

BACKGROUND

In communications networks, there may be a challenge to obtain good performance and capacity for a given communications protocol, its parameters and the physical environment in which the communications network is deployed.

For example, handover is a vital part of any cellular communications network. A handover may be defined as a process of transferring an ongoing connection of a wireless communication device from one radio access network node, denoted as a serving radio access network node, to another radio access network node, denoted as a target radio access network node, in order to accomplish a transparent service over a large coverage area. The handover should be performed without any losses of data transmission to/from the wireless communication device and with as small interrupt as possible for the wireless communication device.

To enable a handover, it is necessary to find a suitable target cell as served by the target radio access network node, and to ensure that it is possible to sustain reliable communication to/from the wireless communication device in the target cell. Candidates for suitable target radio access network nodes and/or target cells are usually stored in so-called neighbor lists, which are stored at least at the serving radio access network node. To make sure that it is possible to sustain reliable communication to/from the wireless communication device in the target cell, the connection quality in the target cell needs to be estimated before the handover can be performed.

The connection quality of the target cell is commonly estimated by measurements related to the wireless communication device, Downlink (DL), i.e. transmission from the radio access network node to the wireless communication device, and/or uplink (UL), i.e. transmission to the radio access network node from the wireless communication device, measurements may be considered. Relying solely on uplink measurements may be unreliable, since the uplink connection quality can be different from the corresponding downlink connection quality. Therefore, handovers in cellular communications networks are commonly based on downlink measurements.

In existing cellular communications networks, all radio access network nodes (Network nodes) continuously transmit pilot signals that wireless communication devices in neighbor cells use to estimate the target cell quality. This is true in the Global System for Mobile Communications (GSM) where such pilot signals are transmitted on the broadcast control channel (BCCH), in the Universal Mobile Telecommunications System (UMTS) where such pilot signals are transmitted on the Common Pilot Channel (CPICH) and in the Long Term Evolution (LTE) telecommunications system where such pilot signals are transmitted as cell specific reference signals (CRS), as well as in WiFi where such pilot signals are transmitted as beacons. This makes it possible to estimate the quality of neighbor cells with relatively good accuracy. The wireless communication devices perform measurements periodically and report the measurements to the network. If it is detected that the serving cell quality is getting near the candidate target cell quality, a more detailed measurement process or a handover procedure may be initiated.

Future cellular communications networks, e.g. 5th generation (5G) system, may use advanced antenna systems to a large extent. With such antenna systems, signals will be transmitted in narrow transmission beams to increase signal strength in some directions, and/or to reduce interference in other directions. When the antenna system is used to increase coverage and signal quality, handovers between narrow transmission beams, either to another beam within the current serving network node, or to a beam from other candidate target network node, may become a necessity. The serving network node also needs to decide if a beam switch or beam update is necessary within its own cell. The transmission beam through which the network node is currently communicating with the wireless communication device is called the serving beam and the transmission beam it will hand over to, or switch to, is called the target beam. The serving beam and the target beam may be transmission beams of the same or different network node.

Applying the principle of continuous transmission of pilot signals in the existing cellular communications networks to the transmission of mobility reference signals (MRS) in all individual transmission beams in such a future cellular communications network may be convenient for mobility measurements performed by the wireless communication devices, but it may degrade the performance of the network. For example, continuous transmission of MRS in all individual transmission beams may generate a lot of interference in the network, it may consume network capacity which is otherwise available for data, and may lead to higher power consumption of the network, since there are large numbers of narrow transmission beams.

Further, in a communications network relying on advanced antennas with narrow transmission beams to improve coverage, it is inefficient, or sometimes even impossible, to transmit the MRS in all transmission beams at the same time. The natural alternative to transmit consecutively in different beams leads to longer measurement periods, slower handovers and beam updates.

In addition, the network makes handover decisions based on mobility measurement reports sent by the wireless communication devices. The quality and accuracy of the measurements depend largely on the MRS allocation. For example, a sufficient number of MRS resource elements (REs) must be available per measurement to achieve a sufficient measurement signal to noise ratio at the wireless communication device. As another example, a MRS placement with a short span of the REs, the measurements may be unduly affected by momentary fading.

Hence, there is a need for an improved network node and method therein for allocation and transmission measurement reference signals in the future communications networks for mobility measurements performed by wireless communication devices.

SUMMARY

It is an object of embodiments herein to provide an improved method and a network node in a wireless communication network for allocation and transmission measurement reference signals which enable the wireless communication devices to perform mobility measurements efficiently and accurately.

According to a first aspect of embodiments herein, the object is achieved by a method performed in a network node for allocating and transmitting Mobility Reference Signals, MRS, for a wireless communication device to measure beam signal quality in a wireless communication network. The network node first obtains information on one or more of a frequency diversity, a time diversity of a channel between the network node and the wireless communication device, an antenna spatial diversity of the wireless communication device. The network node then selects an MRS pattern out of a set of candidate patterns based on the received information. The network node further signals the selected MRS pattern to the wireless communication device and transmits the MRS according to the selected MRS pattern.

According to a second aspect of embodiments herein, the object is achieved by a network node for allocating and transmitting Mobility Reference Signals, MRS, for a wireless communication device to measure beam signal quality in a wireless communication network. The network node is configured to obtain information on one or more of a frequency diversity, a time diversity of a channel between the network node and the wireless communication device, an antenna spatial diversity of the wireless communication device. The network node is further configured to select an MRS pattern out of a set of candidate patterns based on the received information, signal the selected MRS pattern to the wireless communication device and transmit the MRS according to the selected MRS pattern.

By transmitting the MRS according to the selected MRS pattern, the beam signal quality reports by the wireless communication device reflect average beam quality in most scenarios and conditions. As a result, the beam switch decisions are robust and the number of switches over time is minimized. This is achieved without over-dimensioning the MRS allocation for all wireless communication devices in all situations. In contrast to existing systems, these advantages are made possible by dedicated, i.e. wireless communication device-specific DL mobility reference signal configuration, activation and transmission.

In another aspect there is provided a computer program comprising instructions which, when executed on at least one processor in a network node, cause the network node to carry out the method according to the aspect summarized above.

In another aspect there is provided a carrier comprising a computer program according to the summarized aspect above, wherein the carrier is one of an electronic signal, an optical signal, a radio signal and a computer readable storage medium.

These other aspects provide the same effects and advantages as the method aspect summarized above.

BRIEF DESCRIPTION OF THE DRAWINGS

Examples of embodiments herein are described in more detail with reference to attached drawings in which.

DETAILED DESCRIPTION

Figure 1:
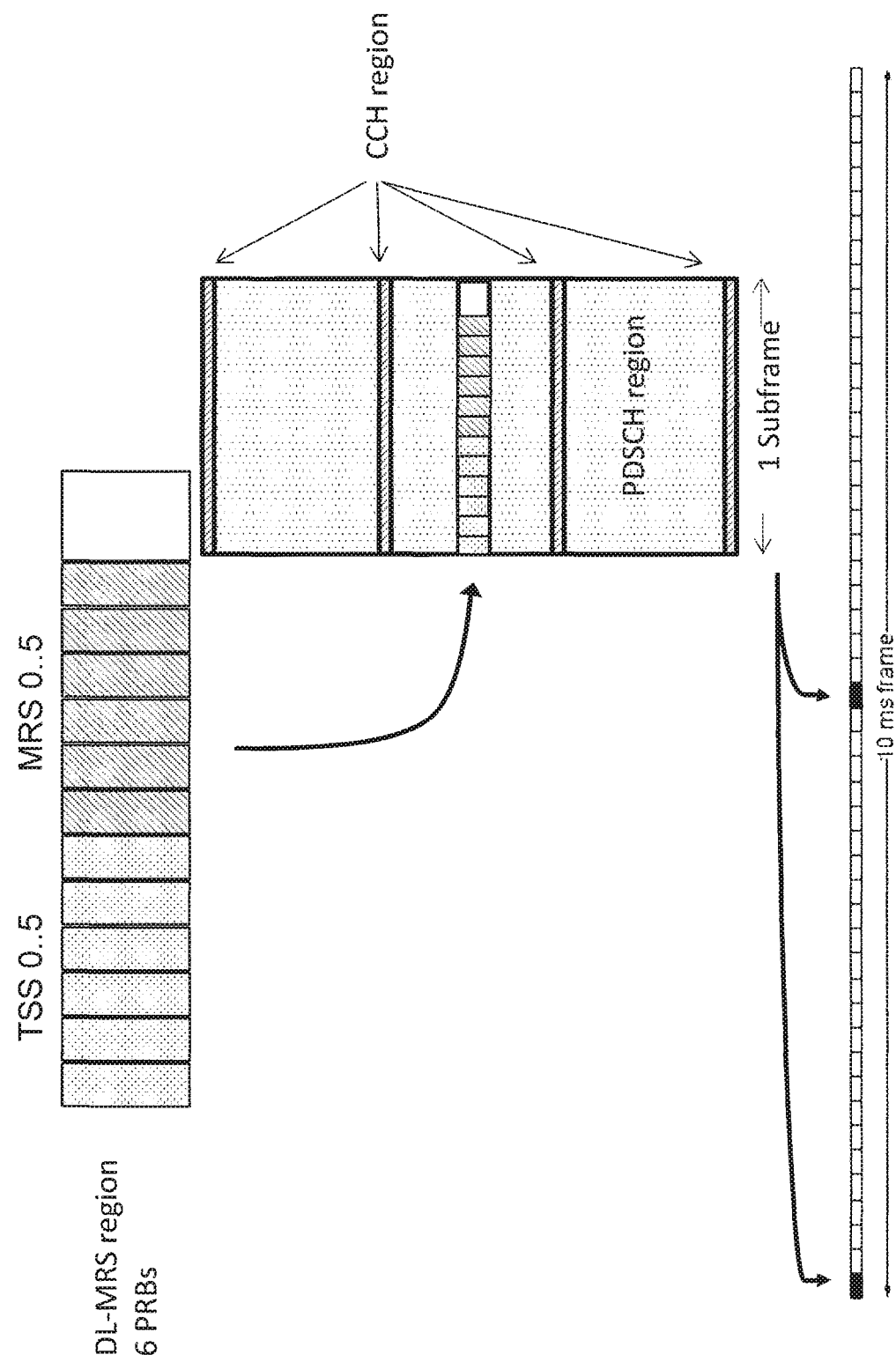
FIG. 1 is a schematic diagram illustrating an example of DL-MRS structure.

As part of developing embodiments herein, handover or beam switching procedure and DL-MRS structure which have been filed as patent applications by the present applicant and proposed to the standardization group for the future modern communication systems will first be described, and some related issues will be identified and discussed.

As used herein, the term "wireless communication device" may refer to a user equipment, UE, a subscriber unit, mobile phone, a cellular phone, a Personal Digital Assistant, PDA, equipped with radio communication capabilities, a smartphone, a laptop or personal computer, PC, equipped with an internal or external mobile broadband modem, a tablet PC with radio communication capabilities, a portable electronic radio communication device or the like.

Further, as used herein, the term "MRS" refers to 1 MRS symbol per field; "MRS pattern" refers to a set of MRS symbols for one beam and for one mobility session; "DL-MRS" refers to time synchronization signal (TSS) or MRS in one mobility subframe for one beam; "DL-MRS structure" refers to TSS/MRS in one mobility subframe for all candidate beams Beam Switching Procedure:

As mentioned in the background, continuous transmission of MRS in all individual transmission beams is inefficient. It is recognized that the majority of time, only a few beams would need to be active as reasonable candidate target beams. To avoid always-on mobility reference signals, the network may instead turn on an appropriate set of candidate target beams when a need for a serving beam update arises. For example, the serving network node may detect when the current downlink serving beam starts to deteriorate by considering channel quality reports received from the wireless communication device and then trigger a downlink-based mobility measurement session when the quality drops below a threshold, e.g. based on information in a look-up-table (LUT). The mobility measurement session will include activation of transmission of mobility reference signals in downlink (DL-MRS) for a set of candidate target beams and requesting the wireless communication device to perform measurements. The wireless communication device will then do measurements on the candidate target beams and report the results to the network. Additional signaling might occur, e.g. the network might inform the wireless communication device about the subset of beam to look for and which reference symbols or beam signature sequences are used.

After receiving the wireless communication device mobility measurement report, the network informs about the preferred target beam, and a beam switch is performed. In preferred network deployments, the beam switch is performed in a manner transparent to the wireless communication device or the user equipment (UE), also referred to as a UE-unaware mode. The new serving beam identity, direction, originating node, etc. are not explicitly signaled to the UE. All active mode control and data traffic continues using the established UE identity, e.g. Radio Network Temporary Identifier (RNTI) settings. As long as the UE makes no channel and interference consistency assumptions across the subframes (SF), the transmitting DL beam parameters may be changed on a SF basis.

Beam Mobility Reference Signal Structure:

The DL-MRS in each beam is self-contained, including necessary signal components to achieve the following functionality:

Time and frequency synchronization with respect to the beam, even if it is transmitted from another node that is not tightly synchronized to the serving node;

Beam signature detection and identification in the presence of other beams activated simultaneously;

Beam signal quality measurement to assess the received beam power or signal-to-interference-plus-noise ratio (SINR), preferably reflecting average quality, not fast fading-related instantaneous quality.

One example of a DL-MRS design is shown in FIG. 1. The upper figure shows a DL-MRS region, which comprises a time synchronization signal (TSS) field and a MRS field, each comprises 6 physical resource blocks (PRBs). For example, if a physical resource block consists of 12 subcarriers in frequency and 7 Orthogonal Frequency Division Multiplexing (OFDM) symbols in time, then the DL-MRS region of 6 PRBs wide in frequency comprises 72 subcarriers. The middle figure shows how the DL-MRS region is located in one SF, where Physical Downlink Shared Channel (PDSCH) region and Control Channel (CCH) region are shown. The lower figure shows a 10 ms frame which comprises a number of SFs, where the SFs which contain DL-MRS region are marked. The TSS field enables coarse time and frequency synchronization in the time domain, which is a reminiscent of the primary synchronization signal (PSS) in LTE system. The MRS field contains a beam-specific signature sequence that is used for beam identification and measurement in frequency domain by correlating with reference signature sequences, and this is a reminiscent of the secondary synchronization signal (SSS) in LTE system. The adjacent fields of the same type are used for time-multiplexing signals from different beams. Additionally, different beams' DL-MRS may be code-multiplexed by using the near-orthogonal property of the MRS sequences. In this design, each field occupies 6 center physical resource blocks (PRBs) in the transmitted band. The UE mobility report is configured to reflect measured MRS quality during one or more DL-MRSs for the beams. The DL-MRS is available with a 5 ms periodicity in this example, but the DL-MRSs are only activated when there is a UE.

In order to minimize the number of beam switches over time, the UE needs to report an MRS measurement result that reflects the average beam signal quality over fast fading. The network configures the DL-MRS structure and DL-MRS SF rate according to criteria that lead to good average performance for the network. However, depending on the propagation scenario, the chosen DL-MRS configuration may work more or less well to average out instantaneous fading. Thus, in some cases, the reported UE measurements may depend on instantaneous fading experienced in certain parts of the time-frequency plane.

Therefore, according to embodiments herein, a DL-MRS design that can provide consistent beam quality estimates in all encountered scenarios is provided. The DL-MRSs in candidate beams for a UE are configured so as to provide sufficient diversity to obtain an averaged measurement result during one mobility measurement session. The method for configuration of MRS will now be described more fully hereinafter with reference to the accompanying drawings.

Figure 2:
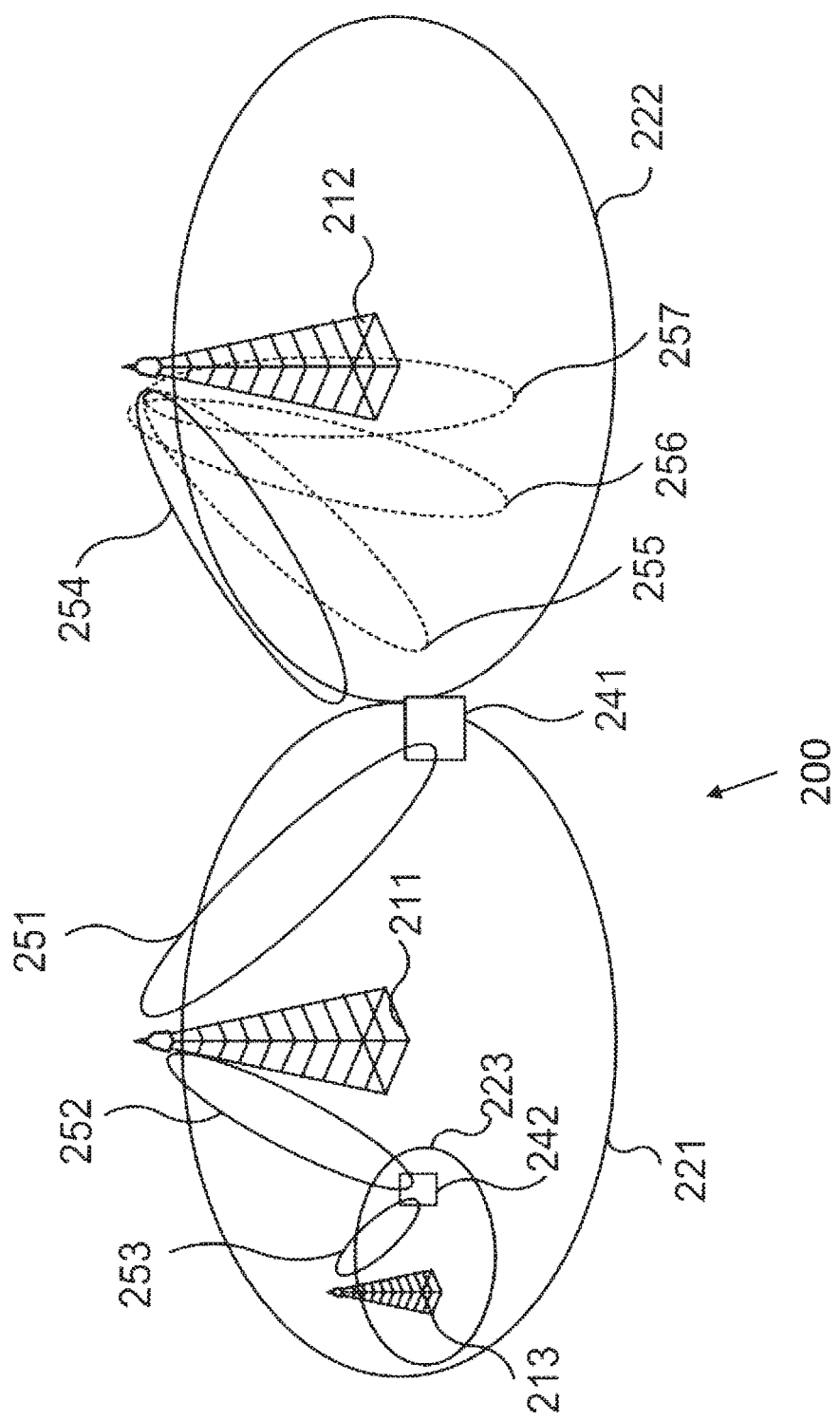
FIG. 2 is a schematic diagram illustrating a wireless communication network according to embodiments herein.

FIG. 2 is a schematic diagram illustrating a communications network 200 where embodiments presented herein can be applied. The communications network 200 comprises radio access network nodes 211, 212 213. The network nodes may be any combination of radio base stations such as base transceiver stations, node Bs, and/or evolved node Bs. The network nodes may further be any combination of macro network nodes 211, 212, and micro, or pica, network nodes 213. Each network node 211, 212, 213 provides network coverage in a respective coverage region 221, 222, 223 by transmitting transmission beams 251, 252, 253, 254, 255, 256 in that coverage region 221, 222, 223. Each network node 211, 212, 213 is assumed to be operatively connected to a core network (not illustrated). The core network may in turn be operatively connected to a service and data providing wide area network.

Hence, a wireless communication device 241, 242 served by one of the network nodes 211, 212, 213 may thereby access services and data as provided by the wide area network. The wireless communication devices 241, 242 may be any combination of mobile stations, mobile phones, handsets, wireless local loop phones, UE, smartphones, laptop computers, and/or tablet computers.

A wireless communication device 241, 242 may move from one position to another position and thus from coverage region 221, 222, 223, thus requiring handover of the wireless communication device 241, 242 from one network node to another network node, or at least from one transmission beam to another transmission beam. As noted above, such handover should be performed without any loss of data transmission to/from the wireless communication device and with as small interrupt as possible for the wireless communication device. The serving beam and the target beam may be transmission beams of the same or different network node. Hence, the term handover as herein used should be interpreted as a handover from a source beam to a target beam.

Figure 3:
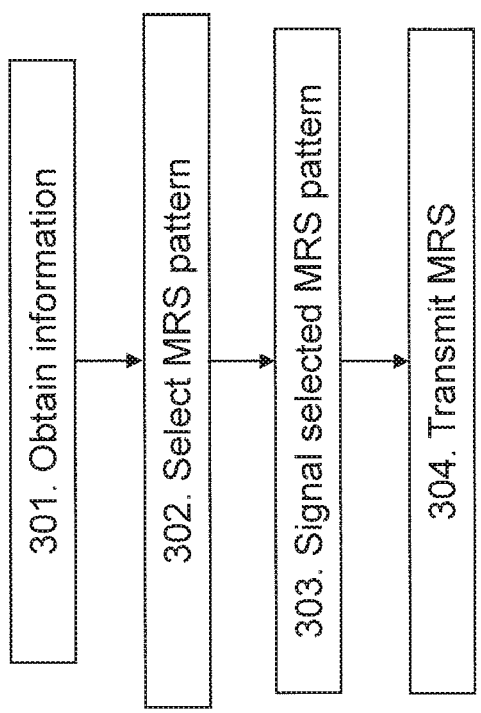
FIG. 3 is a flowchart of a method performed in a network node according to embodiments herein.

Example of embodiments of a method performed in a network node 211, 212, 213 for allocating and transmitting MRS for a wireless communication device 241, 242 to measure beam signal quality in a wireless communication network 200, will now be described with reference to FIG. 3. The method comprises the following actions, which actions may be taken in any suitable order.

Action 301

In order to provide sufficient diversity to obtain an averaged measurement result during one mobility measurement session, the network node 211, 212, 213 needs to have knowledge of the channel conditions between the network node and the communication device. Therefore, the network node 211, 212, 213 obtains information on one or more of a frequency diversity, a time diversity of the channel between the network node and the wireless communication device, an antenna spatial diversity of the communication device.

The frequency diversity of the channel may be referred to, e.g. coherence bandwidth of the channel due to channel dispersion, denoted as Cf. Coherence bandwidth is the bandwidth over which the channel response can be assumed relatively flat. Coherence bandwidth is related to the inverse of the delay spread. The shorter the delay spread, the larger is the coherence bandwidth. The delay spread is a measure of the multipath richness of a communications channel. In general, the delay spread can be interpreted as the difference between the time of arrival of the earliest significant multipath component, typically the line-of-sight (LOS) component and the time of arrival of the latest multipath component.

In communications systems, a communication channel may change with time. Coherence time is the time duration over which the channel impulse response is considered to be relatively non-varying. Such channel variation is much more significant in wireless communications systems, due to Doppler effects. Therefore, the time diversity of the channel may be referred to, e.g. channel coherence time due to Doppler spread or vehicular speed, denoted as Ct.

The network node 211, 212, 213 may obtain estimates of the channel dispersion metric or coherence bandwidth Cf and the Doppler metric or channel coherence time Ct from UL measurements for the the communication device. Alternatively, the communication device may estimate them in the DL and report them to the network node in the UL The antenna spatial diversity of the wireless communication device may be referred to, e.g. a number of antenna elements and antenna element correlation of the wireless communication device. The communication device may report its antenna diversity properties, e.g. the number of receiver antennas, denoted as A, and/or antenna array structure, antenna correlation, etc. as part of its capability signaling. Signals from some receiver antennas may be correlated. The network node may estimate the effective number of independent antennas, denoted as Ai, for the communication device based on the capability and correlation information, current channel information, etc.

Action 302

The network node 211, 212, 213 selects an MRS pattern out of a set of candidate patterns based on the received information.

Generally, the following MRS configuration measures may be taken to increase available diversity if one or more of the time, frequency diversity components is low:

Allocate MRS PRBs or resource elements (REs) over a larger frequency span, or more densely in frequency if underlying frequency diversity is rich.

Allow measurements over a larger number of mobility SF periods during one session, or densify the mobility SF grid in time if underlying temporal diversity is rich.

Based on these principles, an appropriate MRS pattern is selected out of several possible patterns that provides at least a predetermined number of independently faded measurements based on the obtained information. The selection is preferably done so as to minimize the total number of reference symbols per measurement session, subject to one or more time and frequency domain allocation constraints.

Examples of selection criterion and process for configuration of MRS patterns are described in detail with reference to FIG. 4.

Figure 4:
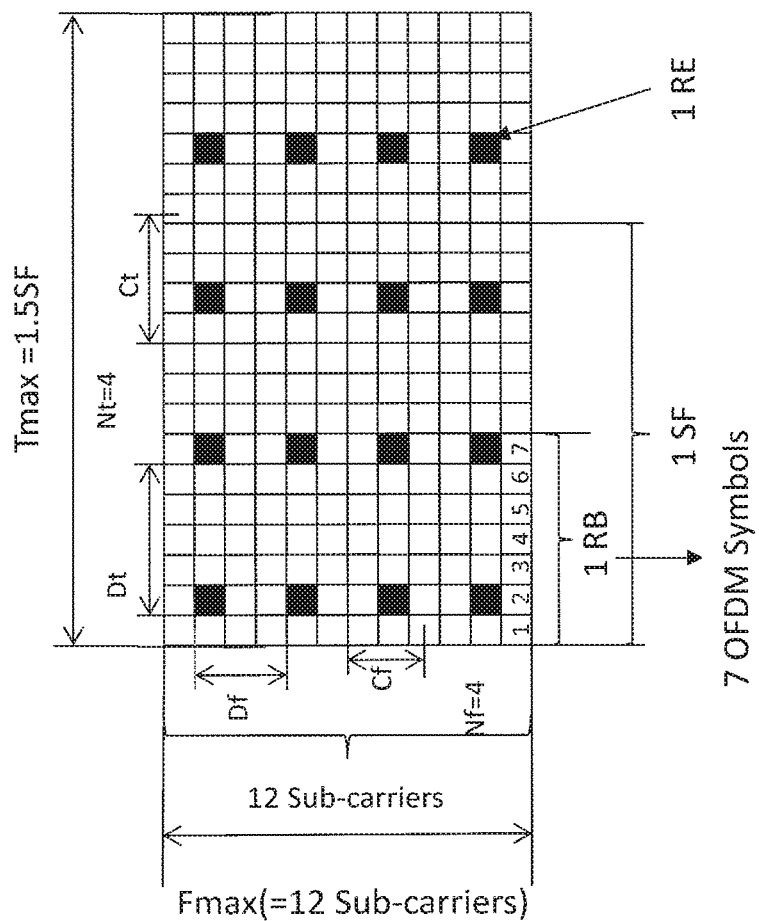
FIG. 4 is a schematic diagram illustrating an example of an MRS pattern.

FIG. 4 shows an example of an MRS pattern, wherein the vertical axis represents frequency dimension in the unit of subcarriers, e.g. the vertical axis comprises 12 subcarriers; the horizontal axis represents time dimension in the unit of symbols, e.g. OFDM symbols. As shown in FIG. 4, the MRS pattern comprises a number Nf of subcarriers in frequency dimension, e.g. Nf=4, which are regularly spaced with spacing Df in the unit of subcarriers, e.g. Df=3, and a number Nt of symbols in time dimension with spacing Dt in the unit of, e.g. OFDM symbols, i.e. Nt=4, Dt=5 during one mobility measurement session. One mobility measurement session may comprise several SFs, and in this example, one mobility measurement session covers 1.5 SFs. One SF may comprise 14 OFDM symbols, or 2 resource blocks (RBs), each RB comprising 7 OFDM symbols as in LTE system. Alternatively, the frequency allocation may be Nf PRBs with spacing Df in units of 12 subcarriers.

Notice here, the units for frequency in subcarrier and time in symbol are merely examples, and the skilled person in the art may understand that other units, e.g. frequency in PRB and time in subframe are also possible.

Let Ct be channel coherence time in the number of OFDM symbols and let Cf be channel coherence bandwidth in the number of subcarriers. Then in this example, Ct=4.2 and Cf=2.5.

The total number of antennas at the communication device is A and the number of independent antennas is Ai.

The main objective of the proposed adaptive DL-MRS configuration process is to guarantee that the communication device bases its mobility measurements on a sufficient number of independently faded measurement symbols, i.e. number of REs in the MRS field. Denote the minimum acceptable number of independent measurement symbols by M min. In one embodiment, M min may be a predetermined number of independent measurement symbols, assigned as M min=10.

To guarantee a sufficient measurement SINR, the total number of measured symbols must typically be larger, denote that limit by L min, e.g. L min may be set as 50.

Then the total number of measurement symbols L is defined by the number of antennas A at the wireless communication device, the number of subcarriers Nf in frequency dimension and the number of symbols Nt in time dimension, such as L=A*Nt*Nf. Therefore, the total number of measurement symbols L should be equal or larger than L min, i.e. L>=L min.

Based on coherence time and bandwidth considerations, the MRS pattern in a given time-frequency span can provide at most Nf*Df/Cf independent symbols in frequency dimension and at most Nt*Dt/Ct in time dimension. The total number of independent measurement symbols, denoted as M, is thus $$M = Ai * \text{ceil}(Nt*[\min(1, Dt/Ct)]) * \text{ceil}(Nf*[\min(1, Df/Cf)])$$

Wherein, the functions min(1,Dt/Ct) and min(1,Df/Cf) are to determine how "independent" the symbols are. Dt and Df are preferably chosen so that the symbols are independent, e.g. Dt>Ct and Df>Cf, then min(1,Dt/Ct)=1 and min(1,Df/Cf)=1. Alternatively, they could also be smaller than Ct and Cf to satisfy that L min is fulfilled. The function ceil(x) returns the smallest integer not less than x.

Therefore, the number of independent measurement symbols M out of the total number of measurement symbols L is defined by the number of independent antennas Ai at the wireless communication device, the number of subcarriers Nf, the ratio of the spacing Df in frequency dimension and channel coherence bandwidth Cf, i.e. Df/Cf, the number of symbols Nt, and the ratio of the spacing Dt in time dimension and channel coherence time Ct, i.e. Dt/Ct.

According to some embodiments, the network node 211, 212, 213 first evaluates the number of independent measurement symbols M for different sets of candidate patterns which comprise different numbers of subcarriers Nf with different spacing Df in frequency dimension and different numbers of symbols Nt with different spacing Dt in time dimension.

Then, the network node selects an MRS pattern which has a minimum number of resource elements in frequency and time dimension, i.e. Nf*Nt, based on a maximum frequency span limit, F max, a maximum mobility measurement session length limit, T max, and a minimum number of measurement symbols L min.

In other words, the network node evaluates different sets of parameters Nf, Df, Nt, Dt such that at least a sufficient total number of measurements symbols received, L=A*Nf*Nt>=L min. It evaluates the number of effective independent measurement symbols M for each such set Nf, Df, Nt, Dt and selects the set where Nf*Nt is minimized while the following conditions and constraints are satisfied:

$$M>=M\ min$$

$$Nf*Df<=F\ max,$$

$$Nt*Dt<=T\ max,$$

Wherein, F max is the maximal frequency span limit. The maximal frequency span limit may be related to the allowed frequency extent of DL-MRS signaling, or the total bandwidth of the carrier, e.g. in FIG. 4, F max may be 12 subcarriers.

T max is the maximal mobility session length limit. T max may be related to the expected time before the communication device loses synch with respect to the current serving beam. The limit may be reduced for the communication devices with high Doppler spread or in areas of the network where sudden beam loss is known to occur, e.g. due to beam coverage loss when moving around the corner.

According to some embodiments, the number of resource elements in frequency and time dimension, Nf*Nt is minimized during one mobility measurement session. As mentioned above, one mobility measurement session may comprise several SFs. If more than 1 SF is used then the MRS symbols should be spaced to have the same Dt.

In embodiments described above, the selection process is to evaluate a collection of predefined MRS patterns. According to other embodiments, with more flexible parameter settings, multi-dimensional numerical optimization algorithms may be applied. For example, the optimization of MRS pattern may be precomputed for a limited set of possible input parameters, the selection of the MRS pattern is then made by mapping the input parameters to an index and doing a table lookup.

The MRS pattern shown in FIG. 4 is just one example, more flexible configurations according to FIG. 4 are possible.

According to some embodiments, simpler MRS allocation principles may be used. In one embodiment, each MRS pattern may comprise certain number of subframes per second and the number of SFs per mobility measurements session is increased to compensate for low channel dispersion and/or low Doppler. This may be seen as applying the general method described above with a collection of candidate parameter sets that is limited to varying a single parameter.

In some scenarios, the fast fading may be infinitely or extremely slow and need not be averaged out in mobility measurement reports. This may be the case in line-of-sight (LOS) and Rician-dominated channels, which may be detected by the network node e.g. by direction-of-arrival (DOA) detection or channel estimate analysis from the network node antenna array. If the analysis detects a dominant single wave front, a minimum set of MRS may be configured for mobility measurements.

Action 303

After the network node have configured or selected the MRS pattern, it signals the selected MRS pattern to the wireless communication device. The communication device then knows on which frequency and at which time to receive the MRS.

Action 304

After the network node has informed the selected MRS pattern to the communication device, the network node transmits the MRS according to the selected MRS pattern.

Although the actions described above are performed for one MRS sequence sent on one beam, the procedure may be applied on all beams and the MRS can be allocated and sent on all candidate beams, i.e. more REs could be reserved for MRS transmission than is given by the MRS pattern for one beam. The DL-MRS structure may either be fixed or the DL-MRS structure may be given by the MRS pattern.

Typically, the diversity provided by the propagation channel is determined by scattering in the vicinity of the communication device and the communication device movement, thus being similar for all serving and candidate beams. The diversity parameters estimated from the serving beam may thus be used to allocate DL-MRS also for candidate beams. In special scenarios, e.g. very high Doppler that may vary for different network nodes, the network may configure the allocation for the communication device according to worst-case assumptions.

The proposed configuration and procedure are adaptive and can also handle special cases like near-zero channel dispersion, e.g. negligible frequency fading, or semi-static operation, e.g. negligible temporal fading, effectively resorting to other available dimension for creating diversity.

By transmitting the MRS according to the selected MRS pattern, the beam signal quality reports by the communication device reflect average beam quality in most scenarios and conditions. As a result, the beam switch decisions are robust and the number of switches over time is minimized. This is achieved without over-dimensioning the MRS allocation for all communication devices in all situations. In contrast to exiting systems, these advantages are made possible by dedicated, i.e. communication device-specific DL mobility reference signal configuration, activation and transmission.

For example, the MRS may be selected and activated in a candidate beam set including the serving and/or possible target beam(s) and the communication device 241, 242 may be instructed to perform measurements on the MRS. The results of the measurements may then be reported to the network node 211, 212, 213 and appropriate beam switching or cell handover operations may be performed.

Figure 5:
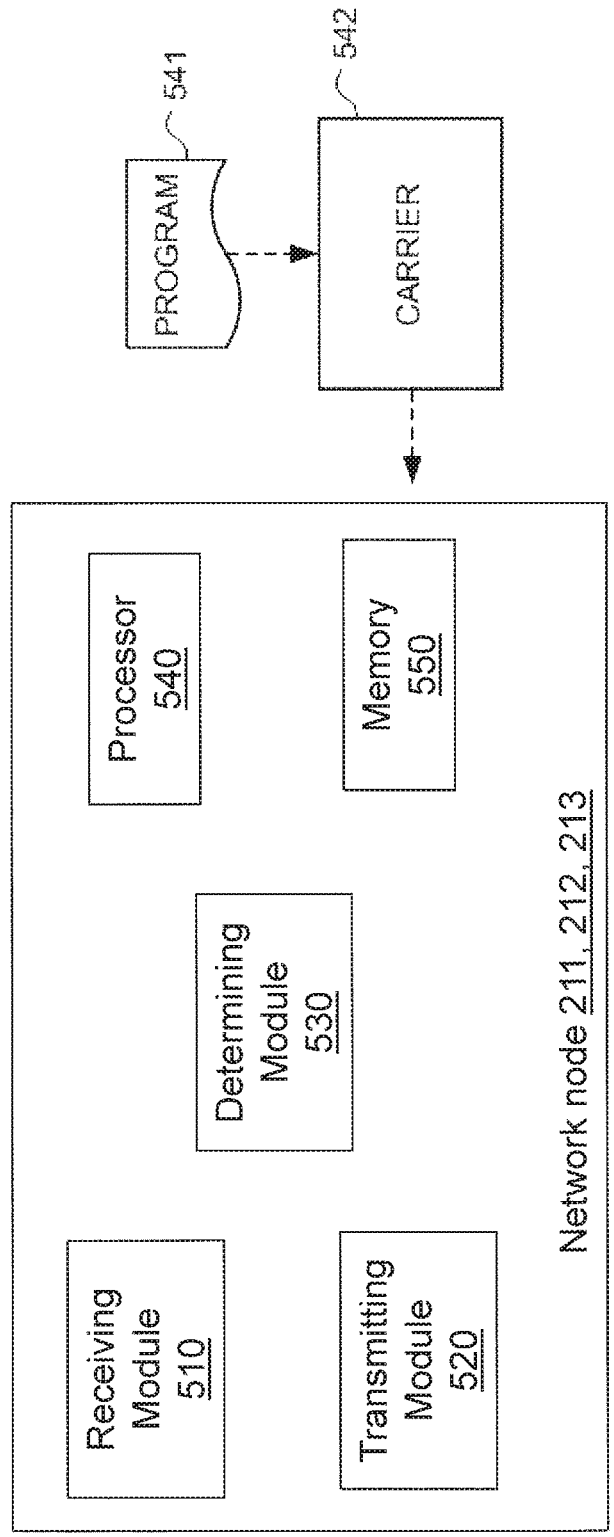
FIG. 5 is a block diagram showing functional modules of a radio access network node according to an embodiment herein.

To perform the method actions in the network node 211, 212, 213 for allocating and transmitting MRS for a communication device 241, 242 to measure beam signal quality in the wireless communication network 200, described above in relation to FIG. 3, the network node 211, 212, 213 comprises the following circuits or modules depicted in FIG. 5. The network node 211, 212, 213 may comprise, e.g. a receiving module 510, a transmitting module 520, a determining module 530.

The network node 211, 212, 213 is configured to, e.g. by means of the receiving module 510 configured to, obtain information on one or more of a frequency diversity, a time diversity of a channel between the network node 211, 212, 213 and the wireless communication device 241, 242, an antenna spatial diversity of the wireless communication device 241, 242.

The network node 211, 212, 213 is further configured to, e.g. by means of the determining module 530 configured to, select an MRS pattern out of a set of candidate patterns based on the received information.

The network node 211, 212, 213 is further configured to, e.g. by means of the transmitting module 520 configured to, signal the selected MRS pattern to the wireless communication device 241, 242 and transmit the MRS according to the selected MRS pattern.

According to some embodiments, the information on one or more of a frequency diversity, a time diversity and an antenna spatial diversity comprises channel dispersion or coherence bandwidth of the channel, Doppler spread of the channel or channel coherence time, a number of antenna elements and antenna element correlation of the wireless communication device 241, 242.

Further, the definitions of parameters Nf, Nt, Ct, Cf, L, L min, M, M min, F max, T max are the same as described above in relation to the method actions.

According to some embodiments, the network node 211, 212, 213 is further configured to, e.g. by means of the determining module 530 configured to, evaluate the number of independent measurement symbols M for different sets of candidate patterns which comprising different numbers of subcarriers Nf with different spacing Df in frequency dimension and different numbers of symbols Nt with different spacing Dt in time dimension; and select an MRS pattern which has a minimum number of resource elements in frequency and time dimension based on a maximum frequency span limit F max, a maximum mobility measurement session length limit T max and a minimum number of measurement symbols L min.

Those skilled in the art will appreciate that the receiving module 510, transmitting module 520, determining module 530 described above may be referred to one module, a combination of analog and digital circuits, one or more processors, such as processor 540, depicted in FIG. 4, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The network node 211, 212, 213 may further comprise a memory 550 comprising one or more memory units. The memory 550 is arranged to be used to store information, e.g. beam signature and identification, lists of target beams, measurements and data, as well as configurations to perform the methods herein when being executed in the network node 211, 212, 213.

The embodiments herein in network node 211, 212, 213 for allocating and transmitting MRS for a communication device 241, 242 to measure beam signal quality in the wireless communication system 200, may be implemented through one or more processors, such as the processor 540 in the network node 211, 212, 213 together with a computer program 541 for performing the functions and actions of the embodiments herein. The computer program mentioned above may also be provided as a computer program product, for instance in the form of a data carrier 542 carrying a computer program for performing the embodiments herein when being loaded into the network node 211, 212, 213. One such carrier may be in the form of a CD ROM disc. It is however feasible with other data carriers such as a memory stick. The computer program code may furthermore be provided as pure program code on a server and downloaded to the network node 211, 212, 213.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed in a network node for allocating and transmitting Mobility Reference Signals (MRS) for a wireless communication device to measure beam signal quality in a wireless communication network, the method comprising:
   obtaining information representing a frequency diversity of a channel between the network node and the wireless communication device, a time diversity of the channel between the network node and the wireless communication device, and an antenna spatial diversity of the wireless communication device;
   selecting an MRS pattern out of a set of candidate patterns based on the obtained information, wherein the candidate patterns differ from one another by one or more of their density in time and density in frequency, and by one or more of their temporal duration and frequency range;
   signalling the selected MRS pattern to the wireless communication device; and
   transmitting the MRS according to the selected MRS pattern,
   wherein selecting the MRS pattern comprises:
      using the obtained information representing the frequency diversity, the time diversity of the channel between the network node and the wireless communication device, and the antenna spatial diversity of the wireless communication device to determine, for each of the candidate patterns, how many independently faded measurements are produced by said each of the candidate patterns; and
      selecting the MRS pattern that produces at least a predetermined number of independently faded measurements within:
         a frequency span that is less than or equal to a maximum frequency span limit, F max, in a frequency dimension; and
         a session length that is less than or equal to a maximum mobility measurement session length limit, T max, in a time dimension,
   wherein the predetermined number is a number of independently faded measurements sufficient to provide a measurement of received beam power or signal-to-interference-plus-noise ratio at the wireless communication device to measure the beam signal quality.

2. The method according to claim 1, wherein the obtained information comprises channel dispersion or coherence bandwidth of the channel, Doppler spread of the channel or channel coherence time, a number of antenna elements and antenna element correlation of the wireless communication device.

3. The method according to claim 1, wherein each MRS pattern comprises a certain number of subframes per second.

4. The method according to claim 1, wherein each MRS pattern comprises a number, Nf, of subcarriers with a spacing, Df, in frequency dimension and a number, Nt, of symbols with a spacing, Dt, in time dimension during one mobility measurement session.

5. The method according to claim 4, wherein a total number of measurement symbols, L, is defined by a number of antennas, A, at the wireless communication device, the number of subcarriers Nf in frequency dimension and the number of symbols Nt in time dimension.

6. The method according to claim 5, wherein a number of independent measurement symbols, M, out of the total number of measurement symbols L is defined by a number of independent antennas, Ai, at the communication device, the number of subcarriers Nf, a ratio of the spacing Df in frequency dimension and channel coherence bandwidth Cf, the number of symbols Nt, a ratio of the spacing Dt in time dimension and channel coherence time Ct.

7. The method according to claim 1, wherein the number of independent measurement symbols M is larger than a predetermined number of independent measurement symbols, M min.

8. The method according to claim 1, wherein the number of resource elements in frequency and time dimension is minimized during one mobility measurement session.

9. The method according to claim 8, wherein one measurement session comprises several subframes.

10. A network node for allocating and transmitting Mobility Reference Signals (MRS) for a wireless communication device to measure beam signal quality in a wireless communication network, the network node is configured to:
obtain information representing a frequency diversity of a channel between the network node and the wireless communication device, a time diversity of the channel between the network node and the wireless communication device, and an antenna spatial diversity of the wireless communication device;
select an MRS pattern out of a set of candidate patterns based on the obtained information, wherein the candidate patterns differ from one another by one or more of their density in time and density in frequency, and by one or more of their temporal duration and frequency range;
signal the selected MRS pattern to the wireless communication device; and
transmit the MRS according to the selected MRS pattern, wherein selecting the MRS pattern comprises:
using the obtained information representing the frequency diversity, the time diversity of the channel between the network node and the wireless communication device, and the antenna spatial diversity of the wireless communication device to determine, for each of the candidate patterns, how many independently faded measurements are produced by said each of the candidate patterns; and
selecting the MRS pattern that produces at least a predetermined number of independently faded measurements within:
a frequency span that is less than or equal to a maximum frequency span limit, F max, in a frequency dimension; and
a session length that is less than or equal to a maximum mobility measurement session length limit, T max, in a time dimension,
wherein the predetermined number is a number of independently faded measurements sufficient to provide a measurement of received beam power or signal-to-interference-plus-noise ratio at the wireless communication device to measure the beam signal quality.

11. The network node according to claim 10, wherein the obtained information comprises channel dispersion or coherence bandwidth of the channel, Doppler spread of the channel or channel coherence time, a number of antenna elements and antenna element correlation of the communication device.

12. The network node according to claim 10, wherein each MRS pattern comprises certain number of subframes per second.

13. The network node according to claim 10, wherein each MRS pattern comprises a number of subcarriers Nf with a spacing Df in frequency dimension and a number of symbols Nt with a spacing Dt in time dimension during one mobility measurement session.

14. The network node according to claim 13, wherein a total number of measurement symbols, L, is defined by a number of antennas, A, at the wireless communication device, the number of subcarriers Nf in frequency dimension and the number of symbols Nt in time dimension.

15. The network node according to claim 14, wherein a number of independent measurement symbols M out of the total number of measurement symbols L is defined by a number of independent antennas Ai at the wireless communication device, the number of subcarriers Nf, a ratio of the spacing Df in frequency dimension and channel coherence bandwidth Cf, the number of symbols Nt, a ratio of the spacing Dt in time dimension and channel coherence time Ct.

16. The network node according to claim 10, wherein the number of independent measurement symbols M is larger than a predetermined number of independent measurement symbols M min.

17. The network node according to claim 10, wherein the number of resource elements in frequency and time dimension is minimized during one mobility measurement session.

18. The network node according to claim 17, wherein one measurement session comprises several subframes.

19. A nontransitory computer readable storage medium comprising instructions which, when executed on at least one processor in a network node, cause the network node to carry out a method in a network node for allocating and transmitting Mobility Reference Signals (MRS) for a wireless communication device to measure beam signal quality in a wireless communication network, the method comprising:
obtaining information representing a frequency diversity of a channel between the network node and the wireless communication device, a time diversity of the channel between the network node and the wireless communication device, and an antenna spatial diversity of the wireless communication device;
selecting an MRS pattern out of a set of candidate patterns based on the obtained information, wherein the candidate patterns differ from one another by one or more of their density in time and density in frequency, and by one or more of their temporal duration and frequency range;
signalling the selected MRS pattern to the wireless communication device; and
transmitting the MRS according to the selected MRS pattern,
wherein selecting the MRS pattern comprises:
using the obtained information representing the frequency diversity, the time diversity of the channel between the network node and the wireless communication device, and the antenna spatial diversity of the wireless communication device to determine, for each of the candidate patterns, how many independently faded measurements are produced by said each of the candidate patterns; and selecting the MRS pattern that produces at least a predetermined number of independently faded measurements within:
- a frequency span that is less than or equal to a maximum frequency span limit, F max, in a frequency dimension; and
- a session length that is less than or equal to a maximum mobility measurement session length limit, T max, in a time dimension, wherein the predetermined number is a number of independently faded measurements sufficient to provide a measurement of received beam power or signal-to-interference-plus-noise ratio at the wireless communication device to measure the beam signal quality.

* * * * *